US010358957B2

(12) United States Patent
Panther et al.

(10) Patent No.: US 10,358,957 B2
(45) Date of Patent: Jul. 23, 2019

(54) MUFFLER AND/OR EXHAUST APPARATUS AND METHOD OF MANUFACTURE

(71) Applicant: Torque Research and Development, Inc., Cheyenne, WY (US)

(72) Inventors: Jason B. Panther, Encinitas, CA (US); James B. Panther, Encinitas, CA (US); Randy Blevins, Anaheim, CA (US)

(*) Notice: Subject to any disclaimer, the term of this patent is extended or adjusted under 35 U.S.C. 154(b) by 364 days.

(21) Appl. No.: 15/144,805

(22) Filed: May 2, 2016

(65) Prior Publication Data
US 2017/0314435 A1   Nov. 2, 2017

(51) Int. Cl.
| B23P 15/00 | (2006.01) |
| F01N 1/08  | (2006.01) |
| B21D 41/04 | (2006.01) |
| B21D 53/84 | (2006.01) |

(52) U.S. Cl.
CPC ............. *F01N 1/083* (2013.01); *B21D 41/04* (2013.01); *B21D 53/84* (2013.01); *B23P 15/00* (2013.01); *F01N 1/08* (2013.01); *F01N 2470/02* (2013.01); *F01N 2490/16* (2013.01); *F01N 2590/00* (2013.01); *F01N 2590/04* (2013.01)

(58) Field of Classification Search
CPC ........ F01N 1/083; F01N 1/08; F01N 2590/04; F01N 2490/16; F01N 2470/02; B21K 1/00; B23P 15/00
See application file for complete search history.

(56) References Cited

U.S. PATENT DOCUMENTS

| 4,094,644 A * | 6/1978 | Wagner ..................... F01N 1/08 422/181 |
| 8,225,476 B2 * | 7/2012 | Mayfield ............... B23P 11/005 29/283.5 |
| 2013/0199869 A1 * | 8/2013 | Murakami .............. F01N 13/08 181/228 |

* cited by examiner

*Primary Examiner* — Rick K Chang
(74) *Attorney, Agent, or Firm* — Matthew A. Pequignot; Pequignot + Myers (57) ABSTRACT

Mufflers with unique configurations which, in certain (but not all) embodiments, improve engine performance. In other embodiments, improved manufacturing processes and methods for making mufflers. In particularly preferred embodiments, methods for making motorcycle mufflers with swaging techniques. In still other preferred embodiments, swaged motorcycle mufflers with improved exhaust flow. In still other embodiments, aftermarket mufflers which can be assembled to a variety of engine exhaust systems utilizing a universal coupler.

10 Claims, 6 Drawing Sheets

MUFFLER AND/OR EXHAUST APPARATUS AND METHOD OF MANUFACTURE

RELATED APPLICATION DATA

None.

FIELD OF THE INVENTION

This invention relates to mufflers with unique configurations which, in certain (but not all) embodiments, improve engine performance. In other embodiments, the invention relates to improved manufacturing processes and methods for making mufflers. In particularly preferred embodiments, the invention relates to methods for making motorcycle mufflers with swaging techniques. In still other preferred embodiments, the invention relates to swaged motorcycle mufflers with improved exhaust flow. In still other embodiments, the invention relates to aftermarket mufflers which can be assembled to a variety of engine exhaust systems utilizing a universal coupler.

BACKGROUND OF THE INVENTION

Mufflers, as components of exhaust systems, are well known in the art as used on automobiles and motorcycles. Indeed, due to noise laws and ordinances at both the federal and local level, mufflers are typically required by law to limit exhibited decibel levels during automobile or motorcycle vehicle operation.

In a conventional muffler, sound waves generated by engine operation (e.g., resulting from piston/valve firings) are channeled through an exhaust system, through manifolds or headers, to where they eventually reach an installed muffler. Then, depending on the muffler design, the sounds waves are manipulated or redirected to reduce decibel output. For example, in certain car muffler designs, the muffler is configured to include sound reflective surfaces so that the amplitude of a sound wave encounters the trough of a different sound wave (e.g., one being directionally reversed by reflection), with the resulting effect being that the "sound" is canceled out (in whole or in part). In other muffler types, such as in motorcycles, it is common to employ sound deadening materials, such as steel wool or fiberglass, which "absorb" sound waves and thus also reduce decibel output. While such motorcycle muffler types—known as packed mufflers—are at least marginally effective at sound deadening or decibel reduction, such prior art muffler designs exhibit drawbacks such as exhaust gas back-pressure buildup, which can reduce fuel efficiency or engine performance, and undesirable acoustic characteristics or output levels.

Prior known motorcycle muffler manufacturing processes or techniques also have attendant drawbacks. For example, in prior known techniques to manufacture a tapered style motorcycle muffler, the mufflers were made from flat (planar) sheet steel which was laser cut, roll formed into a cylinder or cone shape, and then welded along a longitudinal seam (spanning the entire length of the muffler) to close and seal the muffler shell. However, laser cutting and roll forming machines are not only expensive but require high degrees of skill to operate. Similarly, the gas tungsten arc welding (aka "TIG" welding) techniques used (conventional for welding thin steel sheets) are more complex and difficult to master (thus labor is more skilled and expensive) and are comparatively slow, thus increasing muffler production time.

Fulfilling certain market desires, aftermarket mufflers are also known in the art and are often produced and used for aesthetic reasons, altering the acoustic characteristics of an exhaust, or for altering performance characteristics. Known aftermarket mufflers such as for motorcycles, however, must be uniquely produced and configured for specific motorcycle makes and models not only to "fit" the existing exhaust connections but also so that the muffler installs at the proper angle and in an appropriate space envelope (such as won't interfere with normal motorcycle operations).

In view of the above-described drawbacks or problems in the art, it is apparent that there exists a need for a muffler or exhaust which addresses, overcomes, mitigates, and/or solves one or more of such problems and/or drawbacks. It is a purpose of the invention(s) disclosed herein to fulfill one or more of these needs in the art and/or other needs which will become more apparent to the skilled artisan once given the following disclosure.

SUMMARY OF THE INVENTION

Generally speaking, this invention addresses the above-described needs in the art by providing improved processes and methods for manufacturing mufflers. In other embodiments, improved muffler designs and configurations are provided.

In certain of such example, non-limiting embodiments, improved muffler manufacturing processes are provided in which mufflers (e.g., for motorcycles) are formed and assembled utilizing a plurality of metal forming operations. Although, in preferred embodiments, the metal forming techniques include swaging operations, other metal forming techniques may be employed though they may be less advantageous as being less cost effective (or the may require more skill), for example.

In at least one of these improved manufacturing embodiments, a perforated or "louvered" gas flow core (e.g., hollow cylinder) is encapsulated within an outer muffler shell utilizing metal forming (preferably swaging) techniques. Such a core includes louvers or specially configured perforations, in certain embodiments, to intercept sound waves generated by an operating engine at crimps, indentations, or curves, and/or permits such sound waves to travel through provided perforations, to reflect, deflect, slow, and/or cancel sound waves to change engine and/or muffler acoustical characteristics. In certain embodiments, the spacing, size, orientation, and configuration of such perforations or louvers is tailored such that the muffler simultaneously acts to improve engine performance while also "tuning" the acoustical characteristic of the vehicle (e.g., motorcycle) on which it is installed.

In certain preferred example (non-limiting) embodiments, improved muffler configurations (e.g., for motorcycles) are provided in which exhaust gas throughput velocity is increased or other flow characteristics are improved. In such example embodiments, decibel suppression functionality is maintained while simultaneously providing engine performance improvements. Such engine performance improvements include, but are not limited to, increased horsepower and/or increased fuel efficiency.

In still other embodiments, aftermarket muffler configurations and designs are provided which can be installed on a variety of vehicle makes and models (e.g., different motorcycle makes and models). In at least one example of such an embodiment, a universal coupler is provided with an aftermarket muffler which enables the muffler to be installed in an exhaust system at varying angles (e.g., depending on the vehicle or motorcycle type) and be compatible with various sized exhaust ports (e.g., also depending on the vehicle or motorcycle type). In one such example embodiment, a coupler member is installed proximal an inflow end of the hollow gas flow tube with the coupler member being selected from a group of coupler members each having a different configuration for adapting a muffler to a particular make or model of a vehicle, such as a motorcycle.

In at least one particularly useful embodiment of the invention, there is provided: a method of making a muffler for an engine comprising: providing a hollow cylinder comprised of a formable material having an interior muffler volume, to serve as a muffler shell, the hollow cylinder having a starting diameter and having first and second ends, the first end including an inlet opening and the second end including an outlet opening; performing a first forming operation on the first end of the hollow cylinder to reduce the diameter of the first end, the first forming operation also imparting a first taper to the first end of the hollow cylinder; providing a hollow gas flow tube having an inflow end and an outflow end and having a plurality of apertures located and spaced apart on wall portions thereof, and locating the hollow gas flow tube inside of the interior muffler volume; performing a second forming operation on the second end of the hollow cylinder to enclose the hollow gas flow tube inside of the interior muffler volume and to reduce the diameter of the outlet opening of the second end to approximately match the diameter of the outflow end of the hollow gas flow tube, the second forming operation also imparting a second taper to the second end of the hollow cylinder; and performing a sealing operation to eliminate annular gas flow gaps between the outflow end of the hollow gas flow tube and the outlet opening of the second end of the hollow cylinder.

In another useful embodiment of the invention, there is provided a method of making a muffler for a motorcycle engine comprising: providing a hollow metal cylinder having an interior muffler volume, to serve as a muffler shell, the hollow metal cylinder having a substantially uniform starting diameter and having first and second ends, the first end including an inlet opening and the second end including an outlet opening; performing a first swaging operation on the first end of the hollow metal cylinder to reduce the diameter of the first end, the first swaging operation also imparting a first taper to the first end of the hollow metal cylinder; performing a second swaging operation on the second end of the hollow metal cylinder to reduce the diameter of the second end, the second swaging operation also imparting a second taper to the second end of the hollow metal cylinder, the second taper being angularly oriented at a reverse angle relative to the first taper; providing a hollow metal gas flow tube having an inflow end and an outflow end and having a plurality of apertures located and spaced apart on wall portions thereof, and locating the hollow metal gas flow tube inside of the interior muffler volume; performing a third swaging operation on the second end of the hollow metal cylinder to enclose the hollow metal gas flow tube inside of the interior muffler volume and to reduce the diameter of the outlet opening of the second end to approximately match the diameter of the outflow end of the hollow metal gas flow tube; and performing a sealing operation to eliminate annular gas flow gaps between the outflow end of the hollow metal gas flow tube and the outlet opening of the second end of the hollow metal cylinder.

In at least one muffler configuration manufactured in according with the above-described method(s), the muffler includes a first exhaust chamber within the interior space of a hollow metal gas flow tube and a second exhaust chamber defined as the space between the internal walls of the hollow cylinder (preferably metal) and the exterior walls of the hollow metal gas flow tube; wherein exhaust gas, when the muffler is installed on an operating vehicle engine, can travel back and forth between the first exhaust chamber and the second exhaust chamber via entry and egress through the plurality of apertures of the hollow metal gas flow tube; and wherein the annular gas flow gaps are substantially eliminated and sealed such that exhaust gas is unable to exit the muffler directly from the second exhaust chamber but must travel from the second exhaust chamber to the first exhaust chamber, through the plurality of apertures, and from the first exhaust chamber out of the outflow end thereof.

In certain embodiments of such mufflers, when the muffler is installed on an operating vehicle and the vehicle engine is running, the muffler receives exhaust gas at the inflow end of the hollow metal gas flow tube and the exhaust gas travels along a longitudinal path through the length of the hollow metal gas tube within the first exhaust chamber with portions of the exhaust gas entering the second exhaust chamber via passage through the plurality of apertures; and wherein during vehicle operation, exhaust gas pressure builds within the second exhaust chamber following which exhaust gas outflow through the outflow end of the hollow metal gas tube accelerates in velocity. In certain of such embodiments, an engine's horsepower is increased by reducing back pressure in the engine's exhaust system. In such embodiments, it may be advisable to pair the muffler installation with improved air filters to account for increased exhaust flow velocity and/or to perform modifications to alter fuel delivery (e.g., to maintain proper fuel and oxygen ratios in combustion chambers).

In certain embodiments of the inventions, the herein described mufflers can be configured to decrease a vehicle engine's decibel output. In such embodiments, the method of manufacture may include the additional step(s) of affixing a quantity of sound dampening material to the louver core. Such material can be fiberglass, for example, or a fibrous steel material, such as stainless steel wool, which can be tack welded (or otherwise affixed) to an exterior wall portion of the louver core (e.g., preferably in proximity to the perforations or apertures).

In at least one embodiment of the invention, rather than connecting the outlet end of the louvered core directly to the outflow end of the outer shell of the muffler, a cylindrical sleeve (preferably metal) is interposed and connected between the two structures. In a preferred embodiment, the outflow end of the louvered core is swaged to increase it's cylindrical inner diameter so that it substantially matches the outer diameter of the interposed sleeve (or vice versa). Sized as such, the sleeve can be installed in a male/female relationship into the outflow end of the louvered core (or vice versa) and then affixed thereto using welds, mechanical fasteners, or even friction fit connections. In such an embodiment, an acoustical tuning element can also be installed proximal the outlet end of the hollow metal cylinder so that the acoustical tuning element will receive exhaust gas flow, and tune acoustical characteristics during engine operation.

Although, in certain embodiments, the mufflers described herein include one or more frustoconical regions (e.g. two contiguous frustoconical tapered regions with oppositely sloped angles), any other exterior muffler profile can be manufactured.

In certain embodiments of the methods of the inventions disclosed in this application, two exterior muffler shells can be obtained from one length or piece of cylindrical starting material. In such an embodiment, there is provided a method of making a muffler for a vehicle engine comprising: providing a hollow metal cylinder, having an interior airspace volume, as a starting material to be formed into one or more muffler shells, the hollow metal cylinder having a substantially uniform starting diameter and having first and second open ends; performing a first swaging operation on the first end of the hollow metal cylinder to reduce the diameter of the first end, the first swaging operation also imparting a taper to the first end of the hollow metal cylinder; performing a second swaging operation on the second end of the hollow metal cylinder to reduce the diameter of the second end, the second swaging operation also imparting a taper to the second end of the hollow metal cylinder; performing the first and the second swaging operations on only such portions of the hollow metal cylinder such that a middle portion of the hollow metal cylinder retains a non-tapered cylindrical configuration; performing a cutting operation proximal the middle portion of the hollow metal cylinder to separate the hollow metal cylinder into first and second conical halves, each conical halve having an inlet end and an outlet end; performing a third swaging operation on the outlet end of one of the first and the second conical halves to reduce the diameter of the outlet end, the third swaging operation also imparting a taper to the outlet end of the respective conical halve, the taper resulting from the third swaging operation being angularly oriented at a reverse angle relative to the taper resulting from the first swaging operation; providing a hollow metal gas flow tube having an inflow end and an outflow end and having a plurality of apertures located and spaced apart on wall portions thereof, and locating the hollow metal gas flow tube inside of the interior airspace volume of the respective conical halve which has been subjected to the third swaging operation; performing a fourth swaging operation on the outlet end of the respective conical halve which has been subjected to the third swaging operation to enclose the hollow metal gas flow tube inside of the interior airspace volume and to reduce the inner diameter of the outlet end of the respective conical halve to approximately match the outer diameter of the outflow end of the hollow metal gas flow tube; and performing a sealing operation to eliminate annular gas flow gaps between the outflow end of the hollow metal gas flow tube and the outlet end of the respective conical halve. In this example method embodiment, the remaining unused conical halve (created during the cutting operation) can thereafter (optionally) be used to make a second muffler.

Although the methods described herein eliminate many difficult welding operations such as when fabricating an outer muffler shell from rolled sheet steel (which requires a full muffler length weld), welds may be employed with the herein described invention without departing from the scope thereof. For example, in the sealing step where the annular spaces between the outflow end of the central core and the outlet end of the outer shell are closed or sealed, it is sometimes desirable to obtain such "seals" using TIG welds. Moreover, in certain embodiments, prior to such sealing, an end cutting operation may be performed to even the edges of the core and shell outflow/outlet ends (e.g., so that they may be more easily welded together).

Certain embodiments are described coupling a louvered core directly to the outer muffler shell, while other embodiments are described utilizing a cylindrical sleeve interposed therebetween. However, for the purposes of interpreting the claims, if a part—such as a cylindrical sleeve—is connected as an intermediate member, it is considered part of, or as an extension of, the louvered core (or other central core type) and thus still within the scope of claims which do not mention the intermediate member.

In certain embodiments of the mufflers described herein, a central muffler core may be utilized and installed which does not include louvers or perforations. Such an example muffler would exhibit uninterrupted air flow (due to the omission of louvers or perforations) and thus would not take advantage of certain other unique muffler design features described herein (e.g., the use of pressure in a second chamber to increase exhaust velocity in a first chamber). Such a muffler, if manufactured according to the herein described inventive methods, however, would still fall within the scope of what applicants consider their invention.

In some embodiments of a muffler invented by applicants, an acoustic tuning core can be removably installed proximal the outflow end of a muffler. In such embodiments, the core can be installed and removed by a consumer using user friendly mechanical fasteners, for example. Thus, as an advantage, such a core may be installed to comply with noise laws while operating a vehicle on public streets but removed when operating the same vehicle on a private track or off road, for example.

Although the mufflers, and parts thereof, are described herein as being manufactured from metal, other material types may of course be used. Such material types would possess material qualities which would resist degradation (or melting) in heat and may, for example, be ceramic or glass. In such embodiments, the manner of manufacturing the unique muffler designs described herein may be replaced with non-swaging techniques. Similarly, even when the mufflers are constructed of metal, alternative material "forming" or shaping techniques may be employed. These "forming" techniques include, but are not limited to, deep drawing, stamping, hydroforming, use of butting techniques, forging, metal spinning, or any other suitable method or technique (including, of course, swaging).

Although the mufflers described herein are described with particular reference to motorcycles and the like, such mufflers—and the methods of making them—can be utilized in many other vehicle types including (but not limited to) automobiles, scooters, snowmobiles, all terrain vehicles and even water based vehicles, such as boats. Similarly, such mufflers could be installed on any engine (even if not mobile) where either acoustic tuning or performance enhancements are desired.

The meanings of the terms "cone" or "conical"—as used throughout the specification and claims—are intended to be broad. For example, the meanings of such terms include any configuration with a large diameter at one end and a smaller diameter at the other, regardless of whether curves join or extend beyond the ends rather than a simple taper being interposed therebetween.

Certain specific examples of the invention are now described below with respect to certain non-limiting embodiments thereof as illustrated in the following drawings wherein:

DETAILED DESCRIPTION OF CERTAIN EXAMPLE EMBODIMENTS

For a more complete understanding of the present invention, reference is now made to the following description of various illustrative and non-limiting embodiments thereof, taken in conjunction with the accompanying drawings in which like reference numbers indicate like features.

Figure 1:
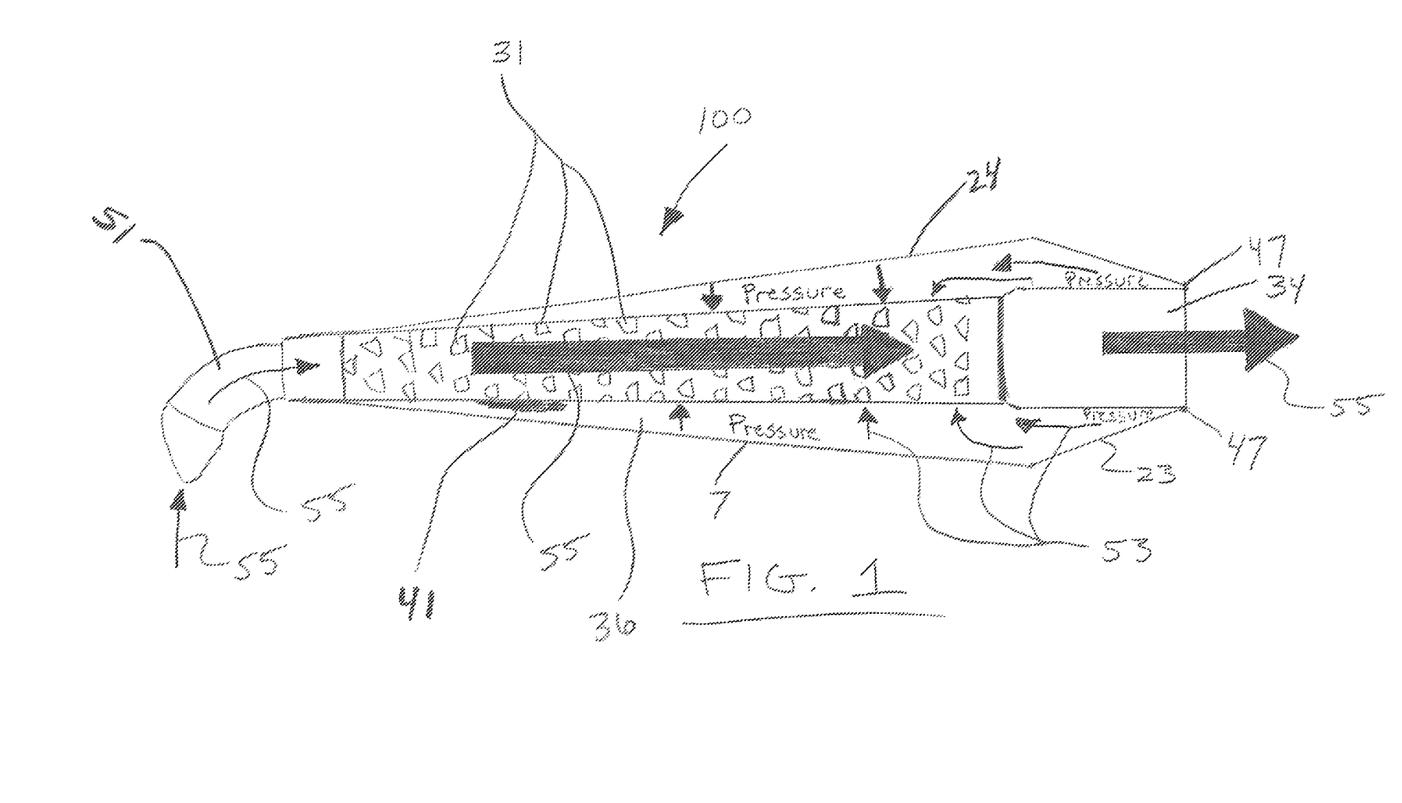
FIG. 1 illustrates one embodiment of a muffler according to the subject invention.

In preferred embodiments of this invention, a manufacturing process is provided which results in improved manufacturing yields and/or reduced manufacturing and/or labor costs. In these same preferred embodiments, a superior muffler, such as the muffler 100 illustrated in FIG. 1, is obtained from the manufacturing process in which structural integrity is increased with the muffler also providing increased engine performance and/or efficiency by delivering a higher cubic-feet-per-minute exhaust gas output (e.g., higher exhaust gas output velocity). In certain installations, this improved exhaustion of combustion gas reduces heat in the headers and increases engine horsepower, while also providing acoustic dampening benefits (e.g., reduced decibel outputs, such as sometimes required by law).

The manufacturing process will now be explained, starting, at first, with reference to FIG. 2. At the beginning of applicants' improved muffler manufacturing process, a starting or stock material is provided in the form of a hollow metal cylinder 1 which preferably has a substantially or completely uniform diameter through its full length. The cylinder includes openings 13 and 14 so that exhaust gas may eventually enter and exit the end product. Although materials other than metal could theoretically be used, applicant has found that 16 gauge, no. 304 stainless steel cylinders with a 4 inch diameter provide an excellent starting material (of course, other metal types or alloys or gauges or sizes may also be employed). The length of cylinder 1 is selected according to the desired length of the muffler or mufflers to be produced. Similarly, the diameter of the cylinder can be selected at a larger or smaller size to accommodate different muffler shapes or dimensions. Preferably, the tubing is annealed to make it soft and/or pliable for subsequent swaging operations.

Figure 2:
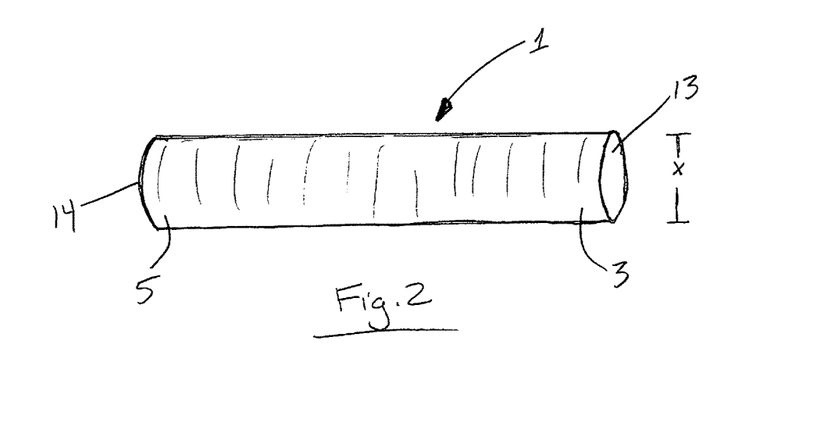
FIG. 2 illustrates a starting material which can be used in at least one embodiment of the muffler manufacturing methods of the subject invention.
Figure 3:
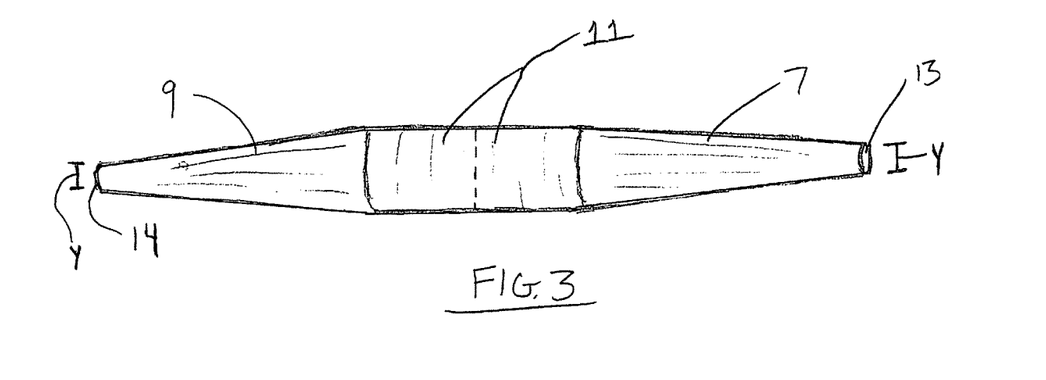
FIG. 3 illustrates the starting material depicted in FIG. 2 after such material has been swaged in two or more swaging operations.

Once an appropriately sized cylinder 1 is obtained (with the desired material qualities), cylinder 1 is swaged at both ends 3 and 5 to reduce the respective end diameters from diameter x to diameter y such as shown in FIGS. 2 and 3. In this preferred embodiment, although the cylinder is swaged at both ends, an unwaged central region 11 is retained for reasons which will be clear during later manufacturing steps. Depending on various factors, the tapers that are obtained—as illustrated in FIG. 3—may be formed in cylinder 1 using either one swaging operation per side 3 and 5, or in multiple swaging operations such as used in an example embodiment preferred by the inventors. More particular, in certain preferred embodiments, the applicants swage both ends 3 and 5 twice, each time to a different depth until a continuous taper 7 and 9 is achieved on each side (with the non-tapered central region 11 maintained). In the next step—illustrated in FIG. 4—cylinder 11 is bisected at its median so that two substantially equal length cone shapes are obtained.

Figure 4:
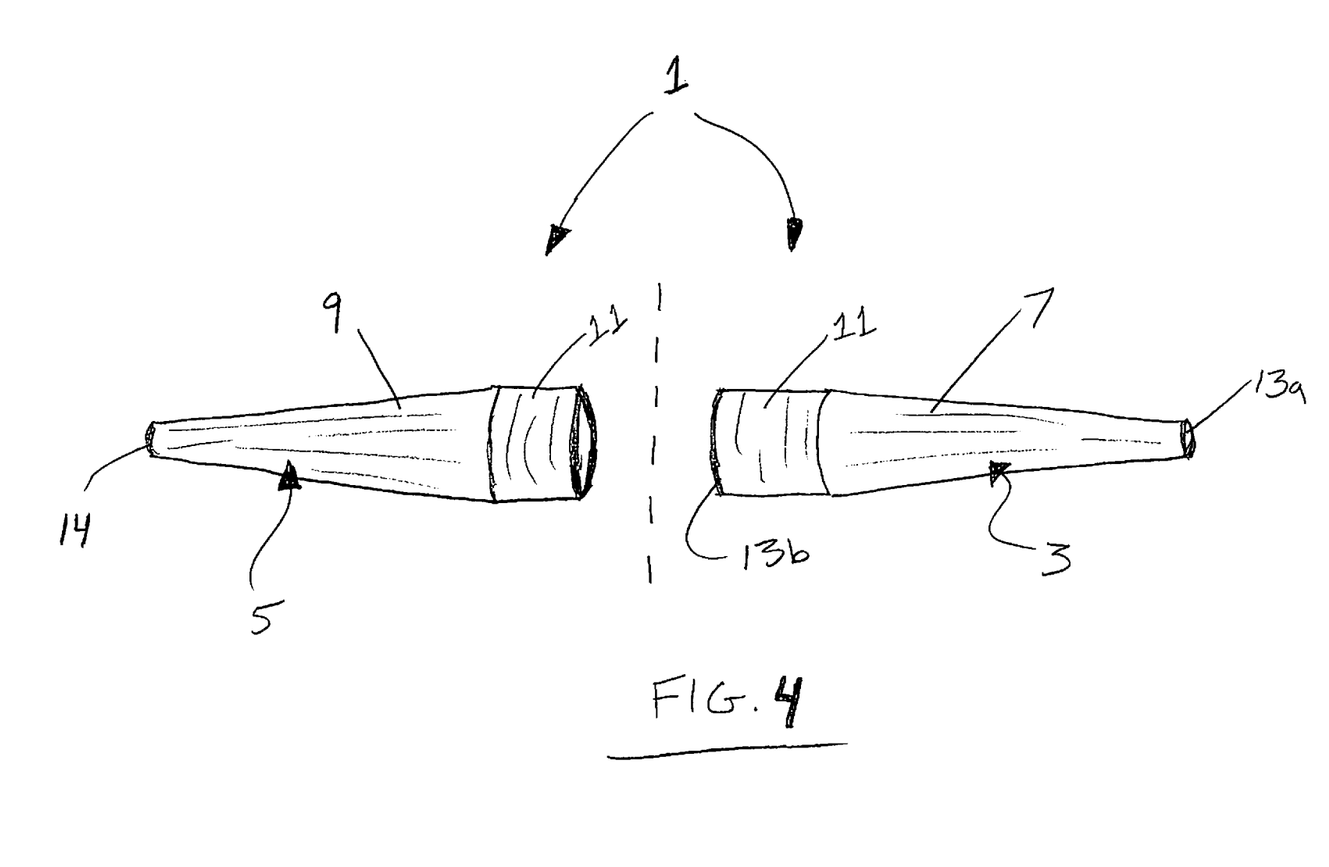
FIG. 4 illustrates the starting material depicted in FIG. 3, after such material has been bisected to provide two conical halves.
Figure 5:
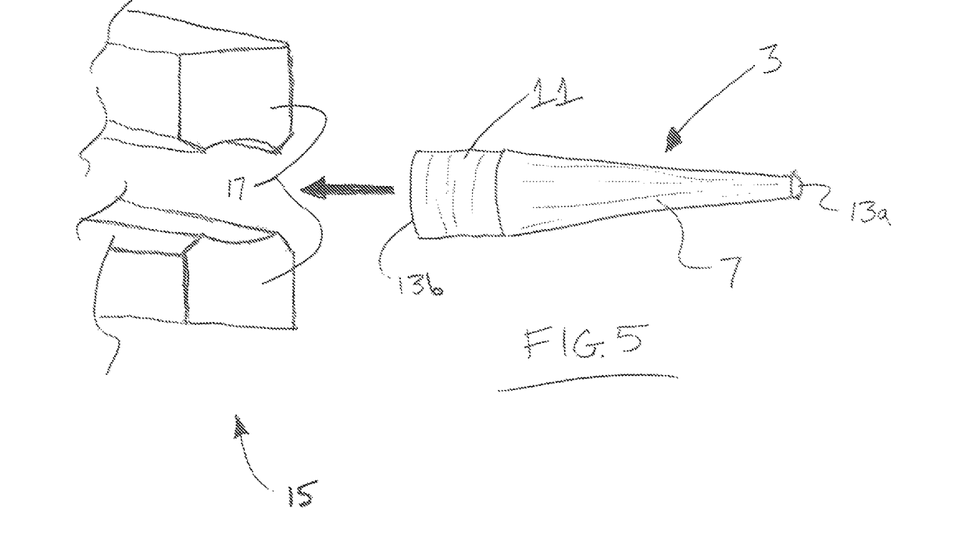
FIG. 5 illustrates a conical halve, produced as shown in FIG. 4, being subjected to an additional swaging step according to one embodiment of the subject invention.

After the step illustrated in FIG. 4, in which two megaphone style shells are obtained, one of ends or resulting conical halves 3 and 5 are selected for further swaging operations. In this embodiment, as illustrated in FIG. 5, conical halve or end 3 has been selected and it is now subjected to additional swaging at the non-tapered region 11 to impart a second taper which is angularly reversed relative to the first taper 7. Such taper is added to the conical halve by inserting the halve into a rotary swaging device, such as depicted as swaging device 15. Swaging device 15 includes swaging dies 17 which are configured to impart a frusto-conical swage to region 11 of the cylinder end (or halve). Lubrication of the part is recommended as is a break-in period for the dies so that smooth swaging results are obtained (with a continuous curve, without angles, or burs, etc.).

Figure 6:
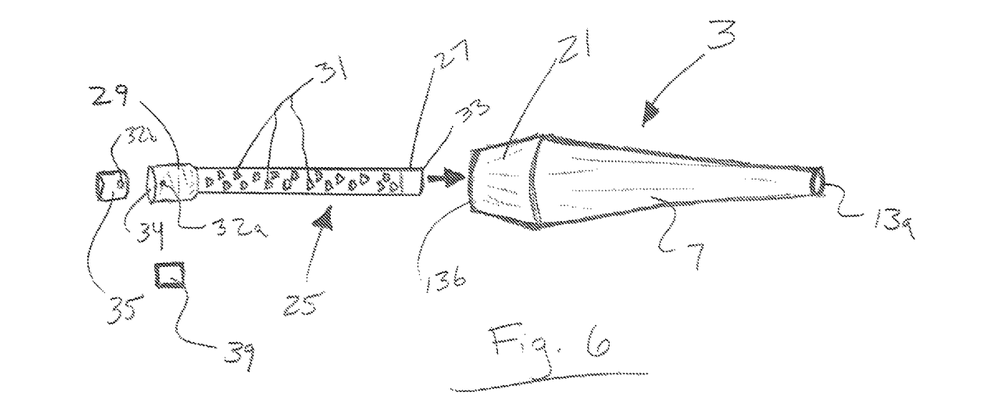
FIG. 6 illustrates a muffler manufacturing step which follows the manufacturing step depicted in FIG. 5, and which includes the installation of a louver core.

In the next step, after the first reverse taper has been added to the cylinder halve, a louver core 25 is inserted into the central, empty air space of the cylinder halve (or end) 3. Louver core 25 is preferably a hollow metal tube with a plurality of apertures or perforations 31 provided spaced apart along the majority of the surface area of the cylindrical wall of the tube (the preferred half moon shaped perforations are depicted in the drawings). Louver core 25 includes ends 27 and 29 which serve as inflow and outflow ends respectively. Each end additionally includes an inflow opening 33 and and outflow opening 34 through which exhaust gas may enter and exit, respectively.

In the preferred embodiment illustrated, a cylindrical sleeve 35 is affixed to the louver core (before or after the core is installed in cylinder halve 3). To enable the assembly of louver core 25 to sleeve 35, core end 29 is swaged to expand its diameter to have an inner diameter which substantially matches (or is just larger than) the outer diameter of the walls of sleeve 35. Sized as such, sleeve 35 can be inserted in louver core end 29 and then affixed thereto (removably or permanently) using a mechanical faster placed through the provided apertures 32a and 32b, as illustrated, or with welds, adhesive, or a friction fit (for example). Of course, core end 29 may be expanded by non-swaging mechanisms as well. An optional acoustical tuning device may also be assembled to the louver end, such as a "quiet core" insert which may be provided to tune decibel output from the resulting muffler. Cylindrical sleeve 35 is optional, however, and may be eliminated entirely. Though it is shown in FIG. 7 (and related figures) for the sake of discussion, the sleeve is intentionally not depicted in FIG. 1 so that it is recognized that a muffler may be produced without one.

After the louver core is inserted as depicted in FIG. 6, an additional swaging operation is performed to reduce the diameter of the outlet end of cylindrical halve (or end) 3 further. In particular, the end is swaged again to obtain a new taper angle depicted as surface 23 in FIG. 7. With this new taper, the diameter of the outlet end of halve 3 has been reduced again such that it substantially matches the outer diameter of cylinder 35. Of course, in embodiments, such as shown in FIG. 1, in which cylinder 35 is omitted, the shell end is tapered so that its diameter substantially matches the outer diameter of louver core end 29. After this additional reverse tapering step, cylinder halve or end 3 now has the configuration of the desired muffler and, indeed, serves as muffler shell 24 (of course additional swaging or shaping steps may be performed to obtain other muffler configurations).

Figure 7:
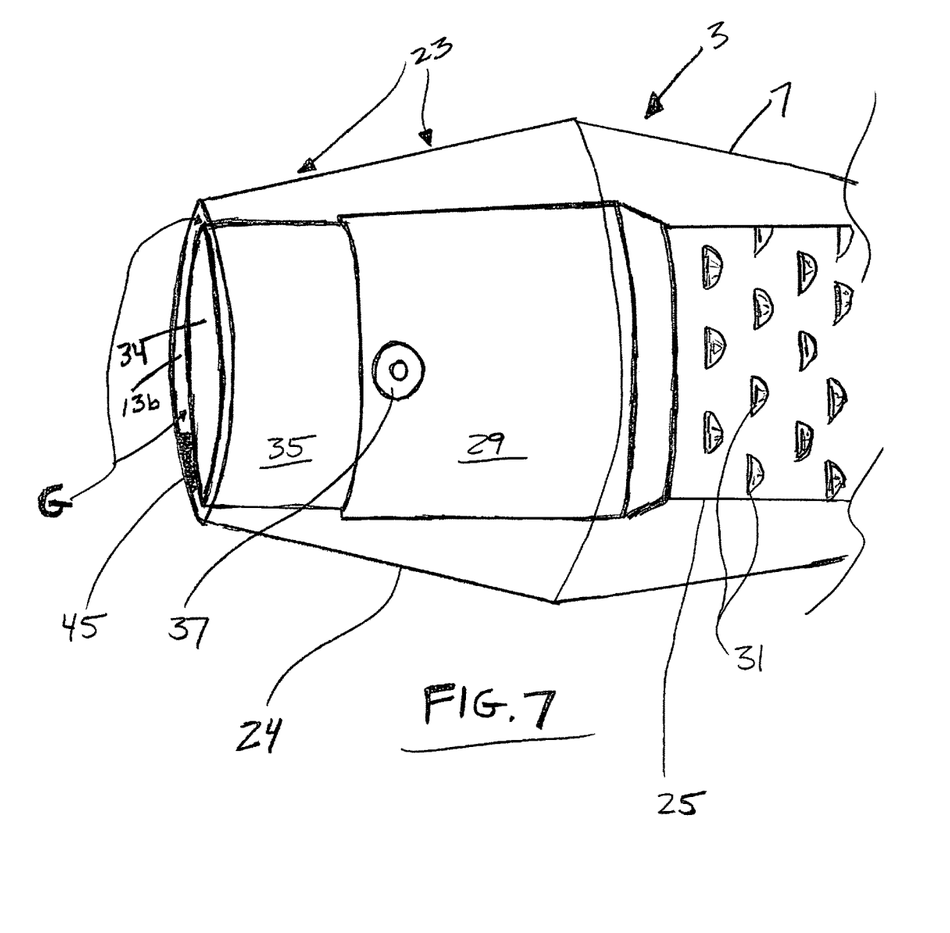
FIG. 7 illustrates a muffler manufacturing step which follows the manufacturing step depicted in FIG. 6, and which includes the sealing of muffler airflow gaps, in accordance with at least one embodiment of the subject invention.

As shown in FIG. 7, even though taper 23 is imparted (in a process which also reduces the end's diameter further) so that the inner diameter of the outlet end of the muffler shell 24 substantially matches the outer diameter of cylindrical sleeve 35, small annular gaps G may remain between the two parts. Thus, in the next manufacturing step, a cutting operation is performed—if necessary—so that the end surfaces of the respective parts are co-planar or flush with one another, and then a sealing operation is performed. In this particular embodiment, because of heat generated when a muffler is installed in a motorcycle exhaust, welds are used to seal and thereby effectively eliminate gaps G, preferably so that the welds are "air tight". In preferred processes, the welds are formed and applied using TIG welding techniques. Also, if cutting operations are used, clamps may be employed to hold the parts still. Chamfering processes may also be used to bevel the edge of the muffler.

While the inlet end of the muffler has dimensions such that the louver core 25 may be press or friction fit to the muffler shell 24, the parts may also be mechanically affixed to one another or welded (or attached with suitable adhesive).

Figures 8, 9:
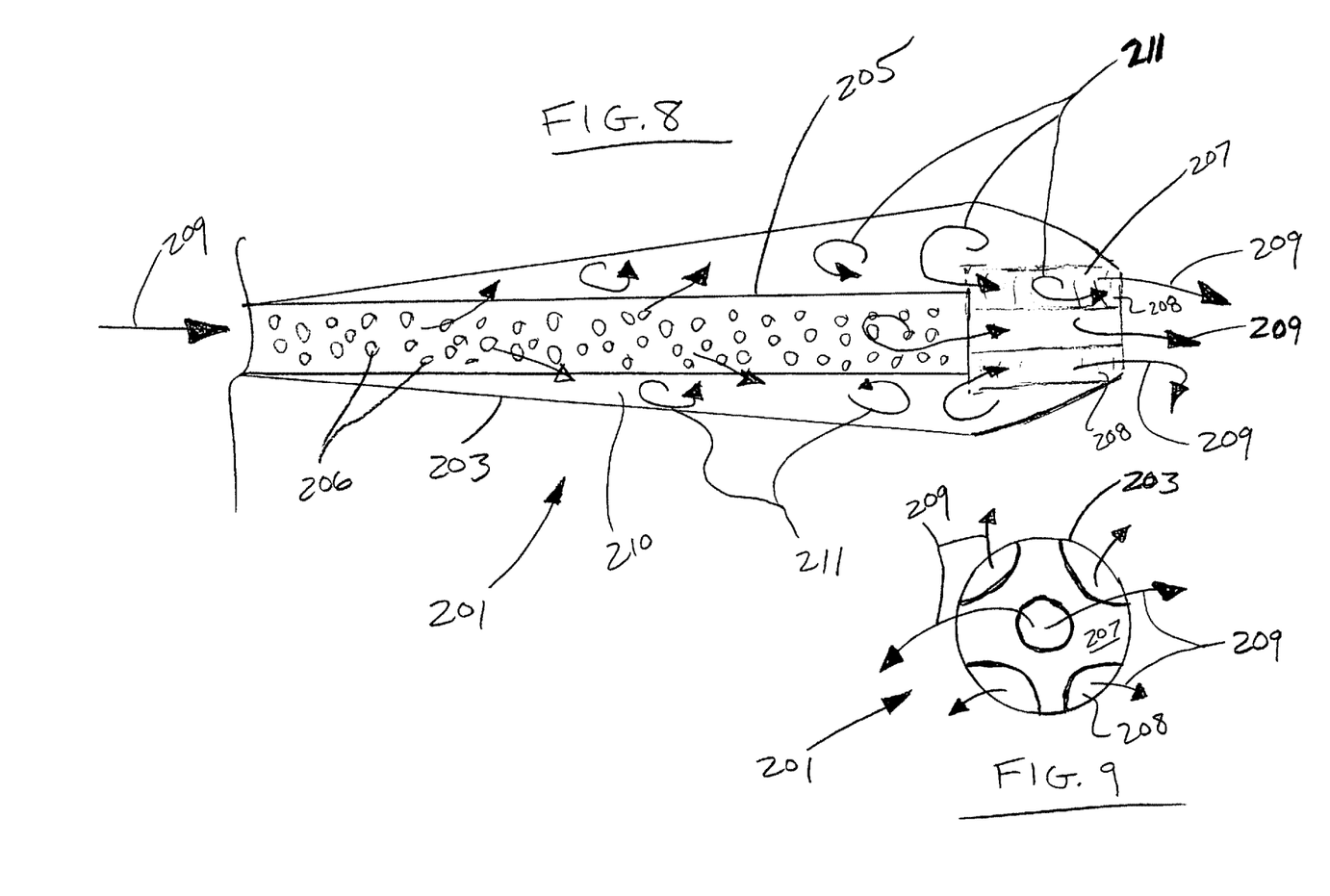
FIG. 8 illustrates a prior art muffler.
FIG. 9 illustrates a cross section of the muffler depicted in FIG. 8.

Assembled and manufactured as described herein, muffler 100—such as shown in FIG. 1—has unique performance advantages. Prior art mufflers, such as shown in FIGS. 8 and 9, have airspace between the outer diameter of a core (e.g., core 205) and the inner diameter of the muffler shell 203 which is unsealed or open to ambient air. More particularly, because the prior art muffler depicted utilizes a cross-shaped core end, with four equally spaced channels 208 via which air or exhaust may enter or leave (e.g., see FIG. 9), when such a muffler is installed on a motorcycle and the motorcycle is operated, exhaust gas will exit the muffler by passing through channels 208, out along exhaust gas pathways 209. Moreover, as exhaust gas enters the prior art inlet end and travels along the inserted core, exhaust gas enters chamber 210 through circular apertures 206. As it does so, exhaust gas airflow becomes turbulent which is exacerbated by the disrupting airflow surfaces present in the interior of the shell, such as the longitudinal weld normally used (and therefore present) in prior art mufflers to seal the rolled sheet steel. This turbulence slows the velocity of exhaust gas not only within the muffler interior itself, but also as the gas exits the outflow end of the inserted core, as the turbulent exhaust from chamber 210 (exiting via channels 208) impinges upon the central exhaust gas path exiting from core 205. Consequently, because of reduced exhaust velocity, back pressure in the exhaust builds which can result in negative performance characteristics (e.g., lost horsepower).

In contrast to the prior art, the inventors of the mufflers described herein have increased exhaust gas exit velocity in one or more ways (in preferred embodiments, in a combination of ways). First, by eliminating the interior longitudinal weld normally present in the prior art, the weld is not present to disrupt normal airflow and cause or contribute to turbulence. Just as or more importantly, however, applicants' muffler seals annular gap G while otherwise avoiding using the channels or the cross shape (at the outflow end) of the prior art. As a result, exhaust gas which enters chamber 36 via passage through perforations 31 cannot exit the outflow end of the muffler without first reversing pathways and re-entering the central pathway portion of the louver core through perforations 31. As a result, exhaust gas pressure builds within chamber 36 (represented as directional arrows 53 in the drawings) during engine operation (such pressure being different than the "back pressure" referred to earlier above) which ultimately impedes further exhaust gas from entering chamber 36 with the pressure (which seeks to reach equilibrium by returning to the center of the louver core) otherwise aiding in accelerating exhaust gas flow out of the louver core along exhaust gas pathway 55.

In certain of such embodiments, a motorcycle upon which such a muffler is installed benefits from increased horsepower and reduced engine heat (e.g., such as in the headers). This increased horsepower results from reducing prior art type back pressure, and increasing the exit velocity of exhaust gas so that new combustion gases can enter the combustion chambers more quickly. In such embodiments, it may be advisable to pair the muffler installation with improved air filters to permit faster oxygen delivery to combustion chambers and/or to perform modifications to speed fuel delivery so that fuel may be provided more quickly to such combustion chambers (e.g., to maintain proper fuel and oxygen ratios).

In certain embodiments of the inventions, the herein described mufflers are configured in one or more ways to decrease a motorcycle's decibel output. In some of these embodiments, the half moon configured perforations, by themselves, disrupt and reflect sound waves in a manner to reduce decibel output. In other embodiments, however, the method of manufacture may include the additional step(s) of affixing a quantity of sound dampening material to the louver core. Such material can be fiberglass, for example, or a fibrous steel material, such as stainless steel wool, which can be tack welded (or otherwise affixed) to an exterior wall portion of the louver core (e.g., preferably in proximity to the perforations or apertures). FIG. 1 illustrates a small section of steel wool 41 affixed to louver core 25 for example purposes. In a typical (preferred) installation for the present invention, however, the steel wool would be packed or wrapped around the entire region of the core where perforations 31 are present.

As another feature of certain preferred embodiments of the invention, coupler 51 is provided (see FIG. 1) to provide a universal install or fit functionality to the herein described mufflers. Using this install method and coupler, the muffler can be adapted to fit on any make or model motorcycle (or scooter or other vehicle). In other words, once a muffler is manufactured and/or configured as described herein, and the make or model of the motorcycle install is decided, a specially configured inlet tube is slid into the louver core (at the inflow end) and welded in with a rotational welder. This is unique because it allows the herein described mufflers to be adapted to virtually any model of motorcycle (or other vehicle) by simply adjusting the size, angle, and/or configuration of the inlet tube (while the muffler configuration itself remains the same). Using such a universal coupler, mufflers of any number can be manufactured for sale before it is even known which make or model motorcycle they will be installed on. This decreases wait times for customers, as mufflers need not be custom manufactured.

Another benefit is that the described configuration improves rigidity and strength via the sandwich of three (3) layers of materials: the muffler shell wall, the wall of the louver core, and the wall of the coupler all sandwiched together (and welded in certain embodiments). Welding the coupler inlet pipe 51 into the louver core 25 allows for a smooth transition between the inlet and the core to minimize the amount of grinding and polishing necessary (to minimize exhaust gas flow disturbance).

Although the example described above entails the production of two muffler shells from a single starting cylinder, other embodiments are within the scope of applicants' invention, including embodiments where a one muffler shell is produced from one starting/stock cylinder (sized appropriately to account for the process differences).

Once given the above disclosure, many other features, modifications, and improvements will become apparent to the skilled artisan. Such features, modifications, and improvements are therefore considered to be part of this invention, without limitation imposed by the example embodiments described herein. Moreover, any word, term, phrase, feature, example, embodiment, or part or combination thereof, as used to describe or exemplify embodiments herein, unless unequivocally set forth as expressly uniquely defined or otherwise unequivocally set forth as limiting, is not intended to impart a narrowing scope to the invention in contravention of the ordinary meaning of the claim terms by which the scope of the patent property rights shall otherwise be determined.

We claim:

1. A method for making a muffler for a motorcycle engine comprising:

providing a hollow metal cylinder, having an interior airspace volume, as a starting material to be formed into one or more muffler shells, said hollow metal cylinder having a substantially uniform starting diameter and having first and second open ends;

performing a first swaging operation on said first end of said hollow metal cylinder to reduce the diameter of said first end, said first swaging operation also imparting a taper to said first end of said hollow metal cylinder;

performing a second swaging operation on said second end of said hollow metal cylinder to reduce the diameter of said second end, said second swaging operation also imparting a taper to said second end of said hollow metal cylinder;

performing said first and said second swaging operations on only such portions of said hollow metal cylinder such that a middle portion of said hollow metal cylinder retains a non-tapered cylindrical configuration;

performing a cutting operation proximal said middle portion of said hollow metal cylinder to separate said hollow metal cylinder into first and second conical halves, each conical halve having an inlet end and an outlet end;

performing a third swaging operation on said outlet end of one of said first and said second conical halves to reduce the diameter of said outlet end, said third swaging operation also imparting a taper to said outlet end of said respective conical halve, said taper resulting from said third swaging operation being angularly oriented at a reverse angle relative to said taper resulting from said first swaging operation;

providing a hollow metal gas flow tube having an inflow end and an outflow end and having a plurality of apertures located and spaced apart on wall portions thereof, and locating said hollow metal gas flow tube inside of said interior airspace volume of said respective conical halve which has been subjected to said third swaging operation;

performing a fourth swaging operation on said outlet end of said respective conical halve which has been subjected to said third swaging operation to enclose said hollow metal gas flow tube inside of said interior airspace volume and to reduce the inner diameter of said outlet end of said respective conical halve to approximately match the outer diameter of said outflow end of said hollow metal gas flow tube; and performing a sealing operation to eliminate annular gas flow gaps between said outflow end of said hollow metal gas flow tube and said outlet end of said respective conical halve.

2. The method according to claim 1 further including the step of making a second muffler utilizing the remaining, unused conical halve created during said cutting operation.

3. The method according to claim 1 further including a first exhaust chamber within the interior space of said hollow metal gas flow tube and a second exhaust chamber defined as the space between the internal walls of said hollow metal cylinder and the exterior walls of said hollow metal gas flow tube;

wherein exhaust gas, when said muffler is installed on an operating motorcycle vehicle, can travel back and forth between said first exhaust chamber and said second exhaust chamber via entry and egress through said plurality of apertures of said hollow metal gas flow tube; and wherein said annular gas flow gaps are substantially eliminated and sealed such that exhaust gas is unable to exit said muffler directly from said second exhaust chamber but must travel from said second exhaust chamber to said first exhaust chamber, through said plurality of apertures, and from said first exhaust chamber out of said outflow end thereof.

4. The method according to claim 3 further wherein, when said muffler is installed on an operating motorcycle vehicle and said motorcycle vehicle engine is running, said muffler receives motorcycle exhaust gas at said inflow end of said hollow metal gas flow tube and said exhaust gas travels along a longitudinal path through the length of said hollow metal gas tube within said first exhaust chamber with portions of said exhaust gas entering said second exhaust chamber via passage through said plurality of apertures;

and wherein during motorcycle vehicle operation, exhaust gas pressure builds within said second exhaust chamber following which exhaust gas outflow through said outflow end of said hollow metal gas tube accelerates in velocity.

5. The method according to claim 4 further wherein, when said muffler is installed on an operating motorcycle vehicle and said motorcycle vehicle engine is running, said muffler increases said motorcycle's horsepower by reducing back pressure in said motorcycle's exhaust system.

6. The method according to claim 5 further wherein, when said muffler is installed on an operating motorcycle vehicle and said motorcycle vehicle engine is running, said muffler decreases said motorcycle's decibel output resulting from engine operation thereof.

7. The method according to claim 6 further including a step of affixing a quantity of fibrous sound dampening material to an exterior wall portion of said hollow metal gas tube proximal said plurality of apertures thereof.

8. The method according to claim 7 wherein said respective conical halve formed into a muffler shell during said respective swaging operations, is shaped to include two opposing frustoconical regions.

9. The method according to claim 6 further including a step of installing a coupler member proximal an inflow end of said hollow metal gas flow tube, said coupler member being selected from a group of coupler members each having a different configuration for adapting a muffler constructed according to said method to be installed on different motorcycle makes and models.

10. The method according to claim 6 wherein said sealing operation includes a welding step.

\* \* \* \* \*